Aug. 14, 1951     D. G. GRISWOLD     2,564,529
PILOT VALVE Filed May 21, 1945     7 Sheets-Sheet 1

Inventor
Donald G. Griswold
By Bacon + Thomas
Attorneys

Aug. 14, 1951 D. G. GRISWOLD 2,564,529
PILOT VALVE
Filed May 21, 1945 7 Sheets-Sheet 3

Inventor
Donald G. Griswold
By Bacon + Thomas
Attorneys

Aug. 14, 1951 D. G. GRISWOLD 2,564,529
PILOT VALVE

Filed May 21, 1945 7 Sheets-Sheet 4

Inventor
Donald G. Griswold
By Bacon + Thomas
Attorneys

Aug. 14, 1951  D. G. GRISWOLD  2,564,529
PILOT VALVE
Filed May 21, 1945  7 Sheets-Sheet 7

Inventor
Donald G. Griswold
By Bacon + Thomas
Attorneys

Patented Aug. 14, 1951

2,564,529

UNITED STATES PATENT OFFICE 2,564,529

PILOT VALVE

Donald G. Griswold, Alhambra, Calif.

Application May 21, 1945, Serial No. 595,006

6 Claims. (Cl. 251—87)

This invention relates to novel pilot valve constructions of general utility adapted to control the supply and exhaust of operating fluid to miscellaneous apparatus, such as a pressure fluid operable main valve or valves, a fluid pressure operable cylinder and piston, etc. The invention further relates to novel methods of making certain of the elements of the pilot valves.

The principal object of the invention is to provide a pilot valve unit which is relatively simple in construction, has but a few parts that can be quickly assembled, and which requires only a very slight force to operate.

Another object of the invention is to provide a pilot valve of small size having the ports thereof arranged so as to provide for a maximum of flow, thus assuring quick operation of the apparatus controlled thereby.

A more specific object of the invention is to provide a pilot valve construction consisting primarily of stamped or drawn sheet metal parts.

Another object of the invention is to provide a pilot valve unit that may be adapted to control various fluid pressure operable devices by varying the porting of a fluid distribution base member which is assembled therewith.

Another object of the invention is to provide a pilot valve unit that may be readily associated with any suitable operating means such as an arm, a float or other means for operating said arm, a rack and pinion, etc., for effecting actuation of the movable element of the pilot valve.

Another object of the invention is to provide a control unit including the present pilot valve and a pressure-responsive device for actuating the pilot valve, all in a single assembly.

A further object of the invention is to provide a relatively simple method of making a multiported rotatable element for use in a pilot valve, or the like.

A still further object of the invention is to provide a relatively simple method of making a ported base member having a seat cooperable with a rotatable multi-ported disc element or the like.

Other objects and features of the invention will be apparent from the following description taken in conjunction with the accompanying drawings, in which.

Referring now to the form of the invention shown in Figs. 1 to 10 of the drawings, the pilot valve unit is generally identified by the letter P and comprises a fluid distribution base member 1 (see Fig. 3), which is provided with six holes 2 extending therethrough. The base 1 is preferably made of brass or other relatively non-corrodible material and one face thereof is provided with a recess 3 for the reception of an annular rubber gasket 4. A hollow housing 5 made of stamped or drawn sheet brass comprises a radially extending flange portion 6 which engages one face of the gasket 4 and terminates in a longitudinally extending flange 7 overlapping a portion of the periphery of the base 1. The flange 6 is provided with six holes 8 aligned with the holes 2 of the base 1, and the gasket 4 is provided with six correspondingly spaced holes 9. Brass bolts 10 extend through each of the holes 8 in the flange 6, the holes 9 in the gasket 4 and the holes 2 in the base 1, and brass nuts 11 are threaded onto the bolts 10 and maintain the housing, gasket and base in assembled relation.

The housing 5 (Fig. 3) also includes a generally cylindrical wall portion 12 which provides a pressure chamber 13 within the housing adjacent the base 1. The wall portion 12 tapers inwardly intermediate of its length as indicated at 14, and then extends longitudinally as indicated at 15 to provide a cylindrical chamber 16, the wall 15 being offset to provide an external shoulder 17 and an internal shoulder 18. The housing 5 still further includes an end wall 19 provided with a central aperture 20 through which a pilot drive shaft 21 extends. A plug member 22 is disposed in the chamber 16 and has a central opening 23 serving as a journal for the shaft 21. The plug 22 includes an enlarged head portion 24 which seats against the shoulder 18 with its periphery having a pressed-fit engagement with the inner surface of the wall 15 to retain the plug in place. The plug 22 is preferably made of brass and has a reduced longitudinally extending portion 25 which terminates at the end wall 19 of the housing 5. The extended portion 25 of the plug 22 is counterbored as indicated at 26 for the reception of a conventional ring-type rubber packing 27 which in its free state is normally circular in cross section and adapted to prevent leakage of operating fluid from the pressure chamber 13 along the shaft 21.

Figure 1:
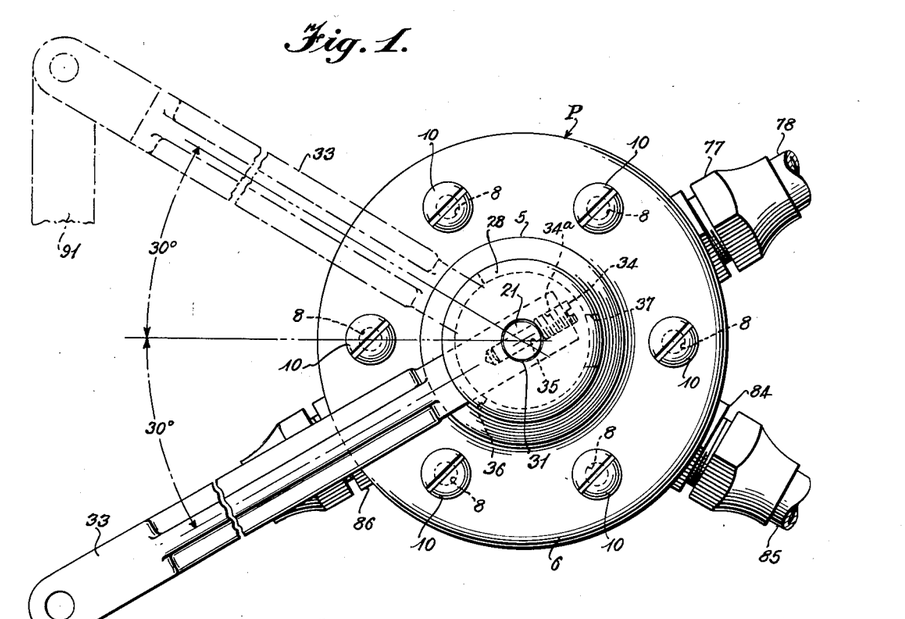
Fig. 1 is an enlarged elevational view of the drive-shaft end of a pilot valve unit constructed in accordance with the principles of the present invention.

A cup-shaped cap 28, formed of stamped or drawn sheet brass, includes a generally cylindrical wall 29 which snugly engages the outer surface of the wall 15 and has its lower edge seated upon the shoulder 17. The cap 28 is preferably secured to the housing 5 by solder as indicated at 30. The cap 28 has a central opening 31 formed in the end wall 32 thereof and the pilot drive shaft 21 projects through said opening and slightly beyond said end wall. The shaft 21 may be rotated by any suitable means, and in Figs. 1, 2 and 3, a brass arm 33 has been shown for this purpose. One end of the arm 33 has an opening 33ᵃ to receive the shaft 21 and said arm is fixed to said shaft by a screw pin 34 threaded into an opening 34ᵃ in said arm and projecting through an opening 35 in said shaft. The cap 28 is provided with an elongated slot 36 through which the arm 33 extends and an aperture 37 positioned diametrically opposite the slot 36 affords means through which the screw 34 may be inserted for mounting in the arm 33 to secure said arm to the shaft 21. The slot 36 is of such arcuate length as to permit the arm 33 to swing through an angle of 30° to either side of a horizontal line passing through the center of the shaft 21, as indicated in Fig. 1, to accommodate the necessary angular movement of a rotatable pilot element R, as will be pointed out in greater detail hereinafter.

Figures 4, 6, 7:
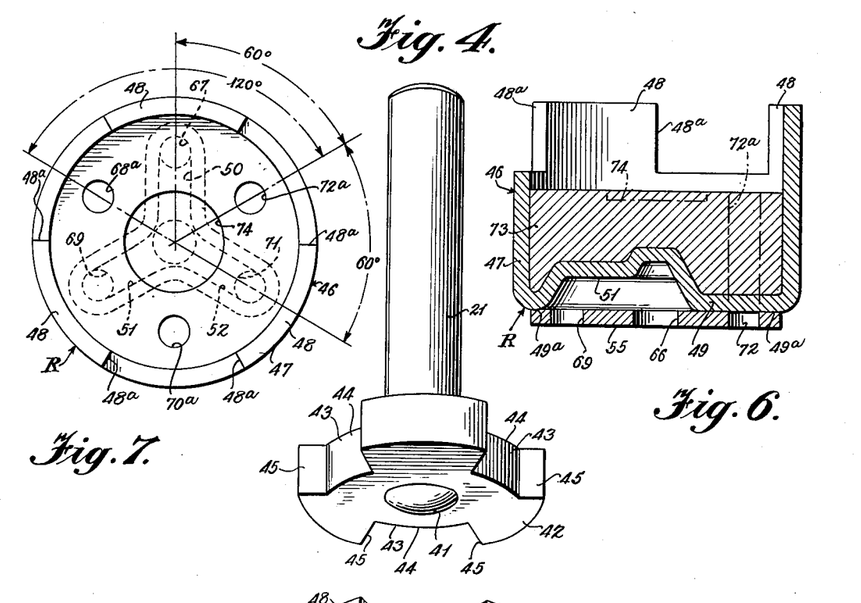
Fig. 4 is a perspective view of the pilot drive shaft and drive washer.
Fig. 6 is a sectional view showing the disc after it has been sweated to the undepressed portions of the bottom wall of the cup, and after the cup has been partially filled with lead, but before any ports have been drilled through the bottom wall and lead core.
Fig. 7 is a plan view of the completed rotatable pilot element.
Figure 5:
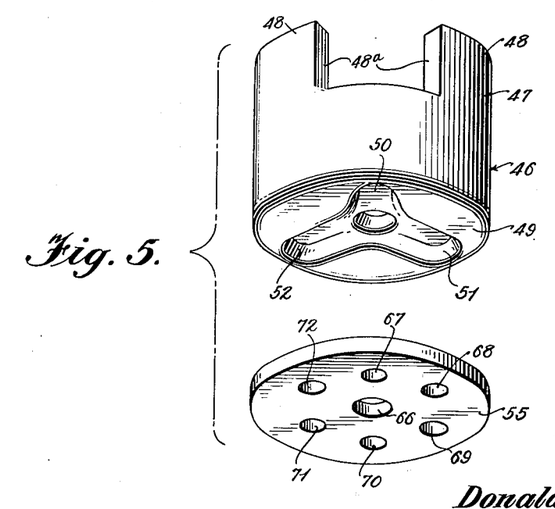
Fig. 5 is a perspective view of the cup and disc comprising the rotatable pilot element, and particularly illustrating the indexed relationship of these parts prior to assembly.
Figures 8, 9, 10:
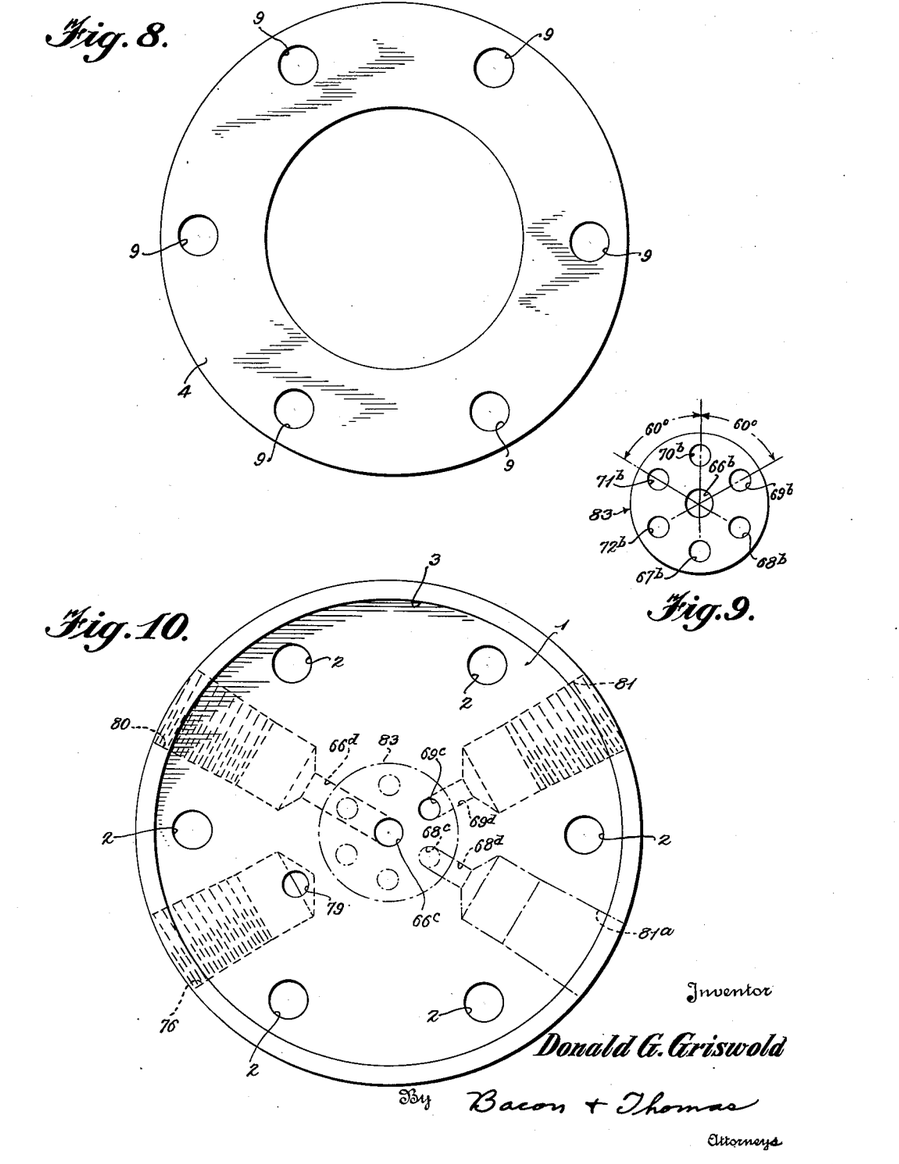
Fig. 8 is a plan view of the gasket per se which is interposed between the pilot valve housing and base member.
Fig. 9 is a plan view of the disc per se which forms a seat for the rotatable pilot element.
Fig. 10 is a plan view of the pilot base per se, particularly illustrating the relationship of the various ports and passageways which are formed therein.

The shaft 21 extends through the plug 22 and into the pressure chamber 13 and its inner end is provided with a series of longitudinally extending serrations or flutes 40. The shaft 21 is preferably made of stainless steel and the fluted end thereof is forced into a central opening 41 in a drive washer 42. The drive washer is best illustrated in Fig. 4 and consists of a generally circular brass stamping provided with three notches 43 spaced approximately 120° apart and defined by arcuate surfaces 44 and radially extending walls 45.

The drive washer 42 is adapted to be operatively engaged with the rotatable pilot element R, previously referred to. The element R consists of a stamped or drawn brass cup 46 (Figs. 3, 5, 6 and 7) having a side wall 47 provided with longitudinally extending projections 48 which are adapted to be received in the notches 43 of the drive washer 42. The sides 48ᵃ of the projections 48 are adapted to be engaged by the radially extending walls 45 of the drive washer 42 so that rotary movement of the drive washer 42 is accompanied by corresponding rotary movement of the cup 46.

The cup 46 has a bottom wall 49 whose exterior surface is smooth except for three radially extending exhaust grooves or depressions 50, 51 and 52 which merge at their inner ends and are formed during the stamping operation by forcing portions of said bottom wall inwardly. The grooves 50, 51 and 52 are arranged upon radii spaced 120° apart, as will be apparent from Fig. 7.

Figure 3:
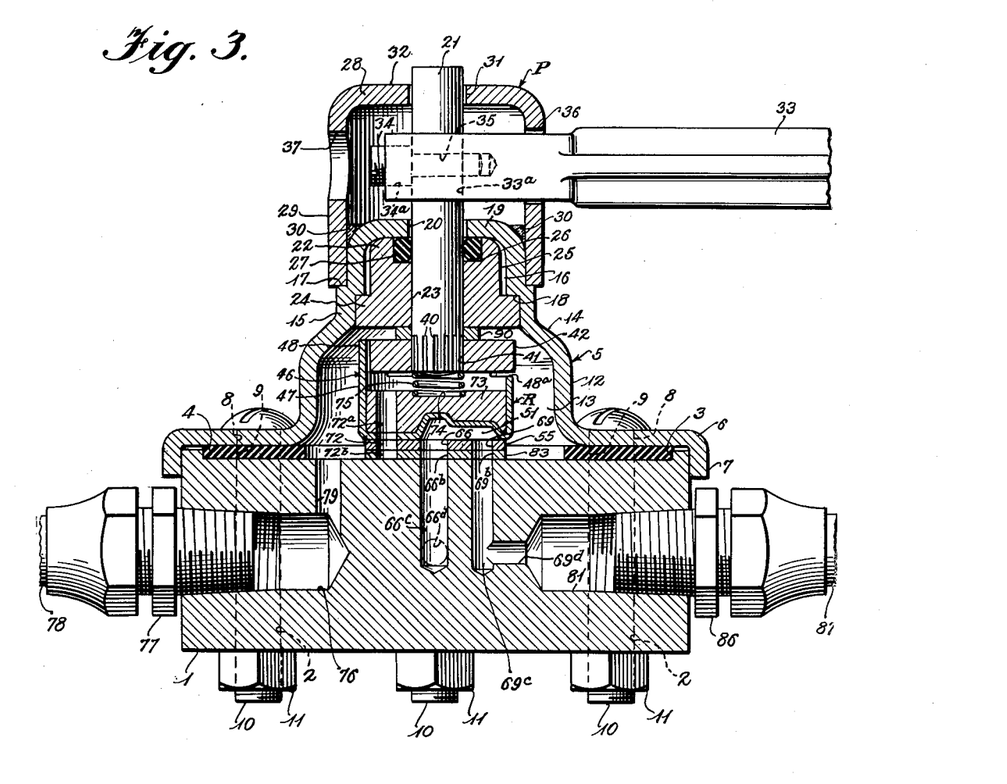
Fig. 3 is an enlarged horizontal sectional view through the pilot valve unit taken on the line 3—3 of Fig. 2.

A disc 55 (Fig. 5) is provided with a central exhaust port 66 and six holes 67, 68, 69, 70, 71 and 72 arranged upon radii spaced 60° apart. In fabricating the disc 55, the same is preferably punched from a strip of stainless steel and the port 66 and holes 67 to 72 are formed by a punching operation. This provides a cheap and inexpensive way of producing the disc 55. The perforated disc 55 is secured to the bottom wall 49 of the cup 46 in any suitable manner, but is preferably "sweated" onto the undepressed portions of said bottom wall by a conventional bonding medium 49ᵃ, as indicated in Fig. 6, the disc 55 first being indexed with the cup 46 so that the holes 67, 69 and 71 communicate with the outer ends of the exhaust grooves 50, 51 and 52, respectively. After the disc 55 has been secured to the bottom wall of the cup 46, said cup is partially filled with molten metal, preferably lead, to weight the same, and after the lead has solidified pressure ports 68ᵃ, 70ᵃ and 72ᵃ (Fig. 7) are drilled through the bottom wall 49 and the lead core or body 73, using the holes 68, 70 and 72 of the disc 55 as a guide and thus utilizing the disc 55 as a template. Fig. 6 indicates the location of the pressure port 72ᵃ in dot-and-dash lines in alignment with the hole 72 of the disc 55. The pressure ports 68ᵃ, 70ᵃ, and 72ᵃ are disposed intermediate the holes 67, 69 and 71, which cooperate with the grooves 50, 51 and 52 to function as exhaust ports. The upper surface of the lead core 73 is then provided with a central counterbore 74 (shown in dot-and-dash lines in Fig. 6) to form a seat for one end of a compression spring 75 (Fig. 3). The outer surface of the disc 55 is ground, if necessary, and then lapped to a smooth finish.

The base member 1 (Figs. 1, 2 and 9) is provided with a radially extending opening 76, which is threaded at its outer end for the reception of a conventional fitting 77 having a supply tube or conduit 78 connected thereto. A port 79 at the inner end of the opening 76 communicates with the pressure chamber 13 of the housing 5 and serves to admit operating fluid under pressure into said chamber from the supply tube 78. The base member 1 is further provided with radially extending openings 80 and 81 which are threaded at their outer ends and merge into radial passageways 66$^d$ and 69$^d$, respectively, at their inner ends. A stainless steel stamped and punched disc 83 (Fig. 9), in all respects identical to the disc 55, is provided with an axial exhaust port 66$^b$ and six holes 67$^b$, 68$^b$, 69$^b$, 70$^b$, 71$^b$, and 72$^b$ arranged upon radii spaced 60° apart. The disc 83 is indexed upon the inner face of the base member 1, as indicated in dot-and-dash lines in Fig. 10 and is then secured to said base member, preferably by a conventional sweating operation. After the disc 83 has been sweated onto the base 1, the hole 69$^b$ is used as a guide for drilling an axial exhaust port 66$^c$ in the base 1 and this port communicates with the inner end of the passage 66$^d$. The hole 69$^b$ is also used as a guide and a port 69$^c$ is drilled in the base 1 and communicates with the inner end of the passage 69$^d$ so that the disc 83 is also utilized as a template. After the ports 66$^c$ and 69$^c$ have been drilled in the base 1, the outer surface of the disc 83 may be ground, if necessary, and then lapped smooth to form a seat for the lapped disc 55 carried by the rotatable member R.

When the pilot valve unit P is to be used for controlling the supply and exhaust through a single working conduit, no additional ports need be drilled in the base 1 in alignment with any of the remaining holes of the disc 83. However, if the pilot valve unit is intended to control the supply and exhaust through, say, two different conduits, then an additional opening 81$^a$ and a passage 68$^d$ may be formed in the base, as indicated in dot-and-dash lines in Fig. 10, and a port 68$^c$ communicating with the passage 68$^d$ may be drilled using the hole 68$^b$ in the disc 83 as a guide. Additional openings, passages and ports (not shown) may be provided in the base 1 using the remaining holes, for example, holes 67$^b$ and 70$^b$ as guides, if desired. The base 1 is preferably a brass casting, and it will be understood that as many as six openings like the opening 76, for example, may be formed by cores and that radial passages, such as the passages 66$^d$, 68$^d$ and 69$^d$, and ports, such as the ports 66$^c$, 68$^c$, 69$^c$ and 79 may be drilled as desired, depending upon the means to be controlled by the pilot valve.

A conventional fitting 84 (Figs. 1 and 2) is threaded into the opening 80 and one end of a drain tube or conduit 85 is connected to said fitting. Another conventional fitting 86 is threaded into the opening 81 and one end of a working tube or conduit 87 leading to a device (not shown) to be controlled by the pilot valve, is connected to said fitting.

In manufacturing the pilot valve unit shown in Fig. 3, it will be obvious that the various elements comprising the same may be mass produced at comparatively low cost. In assembling the pilot valve, it will be apparent that the housing stamping 5 and the cap stamping 28 may be telescoped with the end of the side wall 29 of said cap abutting the shoulder 17 and the parts permanently secured together by the solder 30. The plug 22 with the packing 27 seated in the counterbore 26 may be then force-fitted into the chamber 16 with the head of said plug seated against the shoulder 18. The fluted end 40 of the shaft 21 is forced into the opening 41 of the drive washer 42 to permanently secure these parts together. A semi-hard brass thrust washer 90 is slipped over the end of the shaft 21 and the shaft is passed through the opening 23 in the plug 22 and through the opening 20 in the housing 5 and into the cap 28. The inner end of the arm 33 is then inserted through the slot 36 and the shaft 21 projected through the opening 33$^a$ in the arm, the shaft being advanced until the opening 35 is aligned with the screw hole 34$^a$ in said arm, and then the screw pin 34 is inserted in the opening 35 through the cap opening 37 to fix the arm 33 onto the shaft 21. The spring is then seated in the counterbore 74 of the rotatable element R and the projections 48 on the cup 46 are positioned so that they engage in the notches 43 of the drive washer 42. The gasket 4 is then positioned in the counterbore 3 of the base 1 and placed in confronting relation to the inner face of the flange 6 of the housing 5. The disc 55 is now lightly urged into engagement with the seat disc 83 by the spring 75. There is sufficient "play" between the projections 48 of the cup 46 and the notches 43 of the drive washer 42 to enable perfect seating of the lapped surfaces of the discs 55 and 83. The bolts 10 are then passed through the flange 6, gasket 4, and base 1 and the nuts 10 are then threaded onto the bolts to complete the assembly. The conventional fittings 77, 84 and 86 may then be mounted in the threaded openings 76, 80 and 81, respectively. The supply tube 78 is then connected to the fitting 77 and the drain tube 85 is connected with the fitting 84. The working tube 87, which has one end connected with a pressure operable device (not shown) is then connected at its other end with the fitting 86, and the pilot valve is ready for use.

The arm 33, as has been previously stated, travels through a total angle of 60°. Assuming, as an illustration, that the pilot valve P has the arm 33 associated with a float (not shown) through a rod 91 (shown in dot-and-dash lines in Fig. 1), for controlling the level in a water storage tank (not shown) and that a fluid pressure operable valve (not shown) is connected with the working conduit 87, so that the same is controlled by the pilot valve P, the raised position of the arm 33 (indicated in dot-and-dash lines in Fig. 1) will then correspond to a positioning of the pilot element R relative to the base member 1, such that operating fluid under pressure will be admitted to the fluid pressure operable valve (not shown) to effect closing thereof and, conversely, when the arm 33 is in its lowermost position (shown in full lines in Fig. 1) the pilot element R will be positioned to exhaust operating fluid from such valve to permit the same to open and fill the tank. The converse will be true when the arm 33 is down and the fluid pressure operable valve (not shown) will be closed, all as will be readily understood by those familiar with the art.

Figure 2:
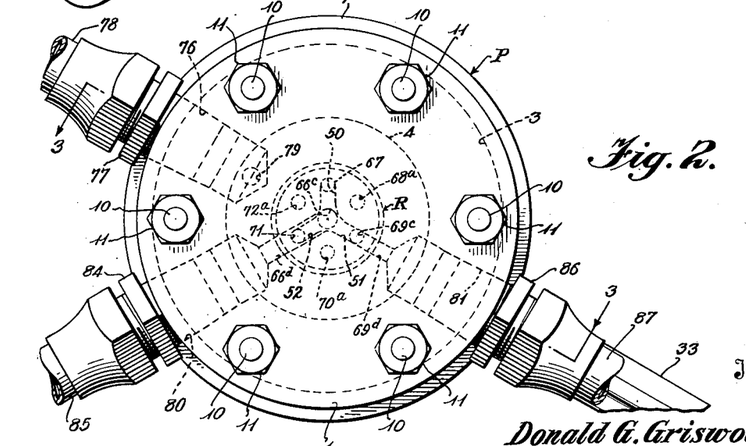
Fig. 2 is an enlarged elevational view of the base-end of the pilot valve unit shown in Fig. 1.

It will be observed that when the arm 33 is in its lowered position, the rotatable element R will assume a position relative to the base 1 indicated in Figs. 2 and 3. Upon reference to these figures, it will be observed that the exhaust groove 51 establishes communication between the working tube 87 and the exhaust tube 85 through passage 69$^d$, port 69$^c$, holes 69$^b$ and 69, exhaust groove 51, exhaust ports 66, 66$^b$ and 66$^c$ and passage 66$^d$, so that spent operating fluid can be exhausted from tube 87 through the pilot valve P and discharged through the drain tube 85.

When the arm 33 is moved to its raised position, the rotatable element R will have been turned through an angle of 60° in a counter-clockwise direction, as viewed in Fig. 2. This will position the pressure port 70$^a$ of the element R in alignment with the port 69$^c$ of the base 1 so that operating fluid under pressure can then pass from the pressure chamber 13 into port 69$^c$ and passage 69$^d$, and into tube 87 to actuate the device (not shown) to be controlled.

It will be apparent from the foregoing description that the through-ports 68$^a$ and 72$^a$ perform no function with the particular porting of the base 1 shown and could be omitted, if desired. The same is true of the exhaust grooves 50 and 52, and these could also be omitted, if desired. However, in order to adapt the rotatable element R to perform a maximum number of control operations it is preferable to include the ports 68$^a$ and 72$^a$ and grooves 50 and 52, it being understood that the grooves 50, 51 and 52 are all formed at the time that the cup 46 is stamped and it also being understood that the through-ports 68$^a$, 70$^a$ and 72$^a$ are preferably simultaneously formed by a multiple drilling operation.

Figures 13, 20:
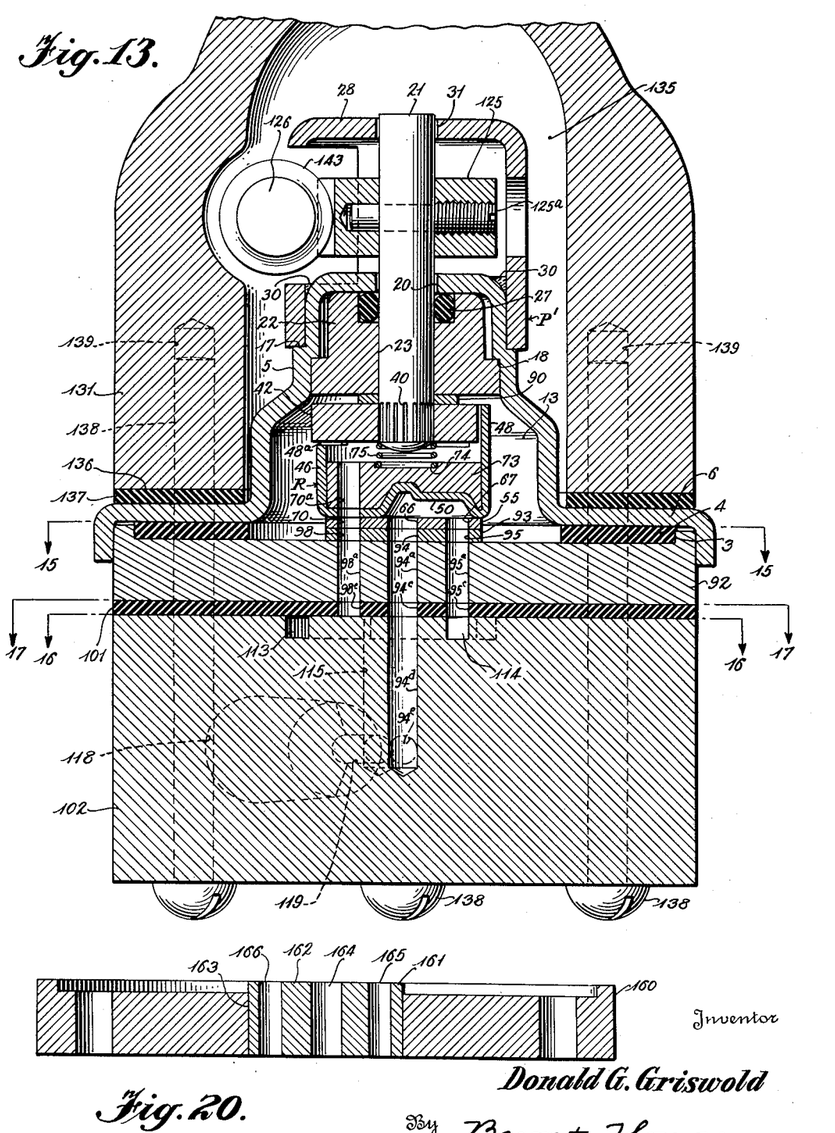
Fig. 13 is an enlarged sectional view taken on the line 13—13 of Fig. 12.
Fig. 20 is a sectional view through a modified form of base member.
Figure 14:
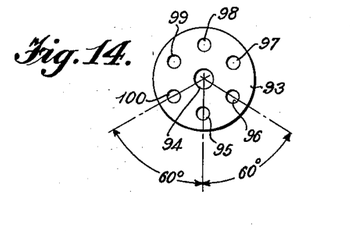
Fig. 14 is a plan view of a seat disc.
Figure 15:
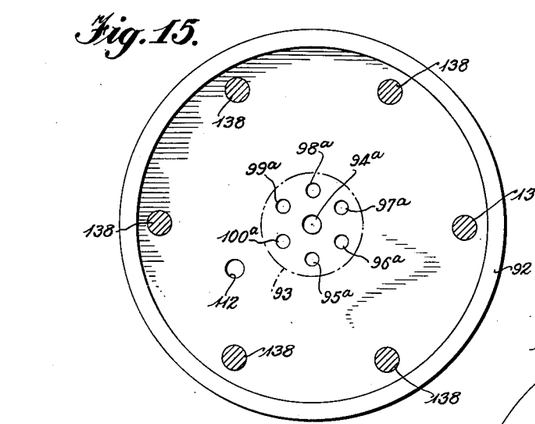
Fig. 15 is a plan view of a modified base member per se, as viewed on the line 15—15 of Fig. 13, with a seat similar to that shown in Fig. 14 indicated in dot-and-dash lines.

Referring now to Figs. 11 to 18, the pilot valve P' here shown is similar to that illustrated in Fig. 3, but includes modified base elements and is shown in association with a pressure-responsive device X and a diaphragm-type pressure relief valve V connected in a pipe line L. The corresponding parts have been identified by the same reference numerals in order to avoid repetition of description. The modified pilot valve P' includes a cast brass base member 92 which is best illustrated in Figs. 13 and 15. As here shown, a stainless steel disc stamping 93 (shown in dot-and-dash lines in Fig. 15) similar to the disc 83, is secured to the inner face of the base 92, preferably by a conventional sweating operation. The disc 93 is provided with a central exhaust hole 94 and six additional holes 95, 96, 97, 98, 99 and 100 (Fig. 14), arranged on radii spaced 60° apart, and these holes serve as guides for drilling seven ports 94$^a$ to 100$^a$ (Fig. 15) in the base member 92 in alignment therewith. The last-mentioned ports register with passages 94$^c$ to 100$^c$ (Fig. 17), respectively, formed in a suitable rubber gasket 101. The gasket 101 is interposed between the base member 92 and a cast brass, sub-base or fluid distribution member 102.

Figures 11, 12:
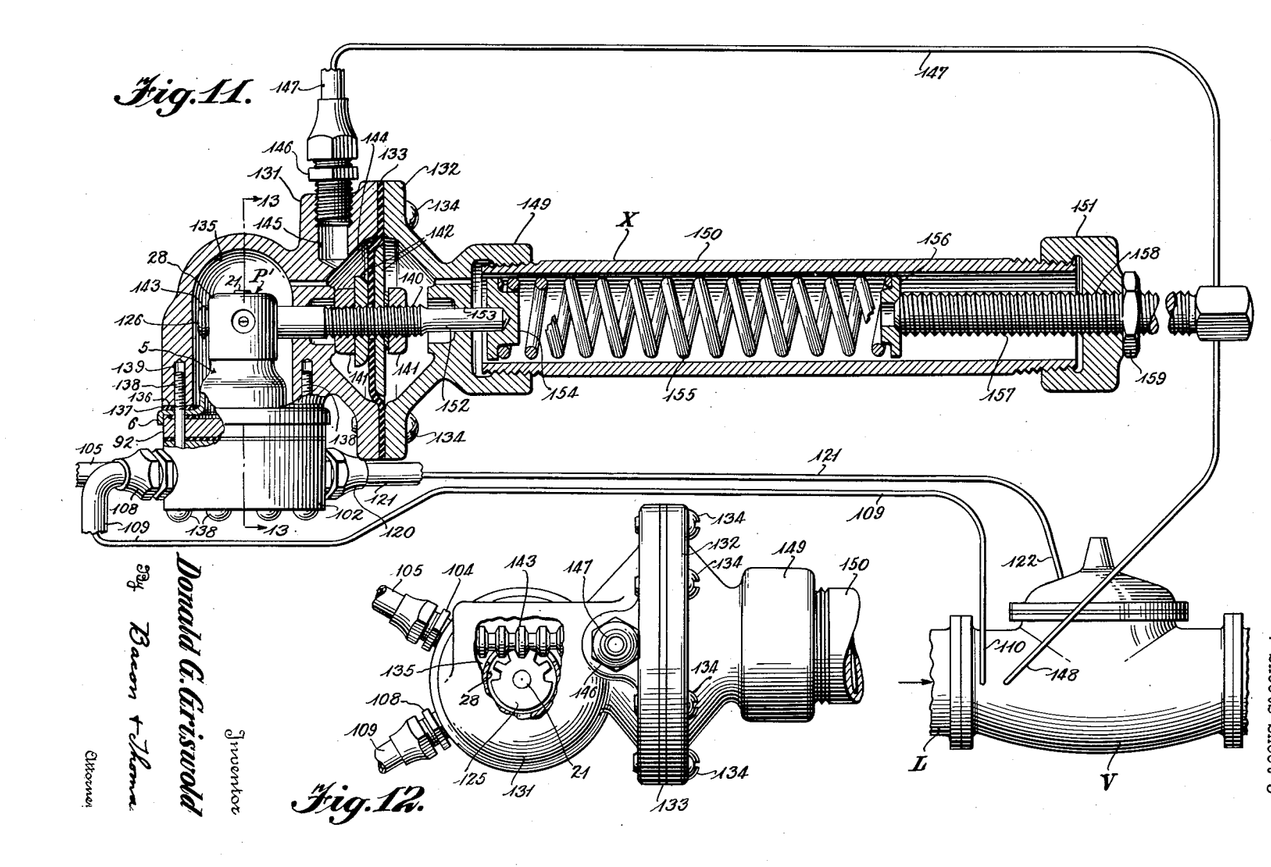
Fig. 11 is a somewhat schematic view, partly in section, illustrating the manner in which a control unit including a pilot valve and a pressure-responsive device for actuating the same may be associated with a conventional diaphragm valve to make the said diaphragm valve act as a pressure relief valve.
Fig. 12 is a fragmentary plan view of the control device shown in Fig. 11 with portions broken away to illustrate the manner in which rotation of the pilot drive shaft is effected by the pressure-responsive device.
Figure 16:
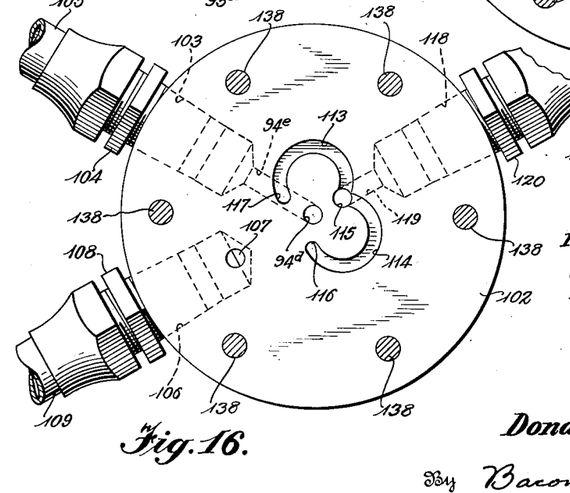
Fig. 16 is a sectional view taken on the line 16—16 of Fig. 13 and particularly illustrating the porting of the sub-base or fluid distribution base member.
Figure 17:
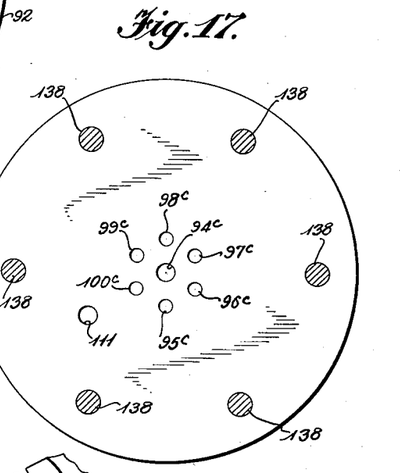
Fig. 17 is a plan view of the gasket per se which is interposed between the base and sub-base members as viewed on the line 17—17 of Fig. 13.
Figure 18:
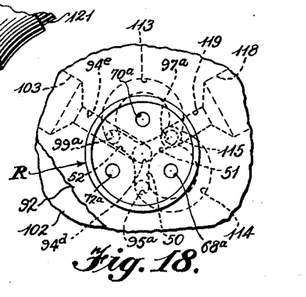
Fig. 18 is a diagrammatic view showing the relative positions of the porting of the sub-base and rotatable pilot element of Fig. 13 corresponding to the open position of the pressure relief valve.

The details of the porting and passages of the base 102 are best illustrated in Fig. 16. It will be noted from this figure, that the base 102 is provided with a central drain port 94$^d$, which communicates with an opening 103 threaded at its outer end and merging at its inner end with a passage 94$^e$. The outer end of the opening 103 is threaded to receive a conventional fitting 104 having a drain tube 105 connected thereto. The base 102 has another opening 106 which is threaded at its outer end, and a pressure fluid supply port 107 extends inwardly from the inner face of said base and communicates with the inner end of said opening. A conventional fitting 108 is mounted in the opening 106 and one end of a supply tube 109 is connected to said fitting, the other end 110 of said tube communicating with the inlet opening of the pressure relief valve V, as shown in Fig. 11. The port 107 is aligned with a passage 111 in the gasket 101 which in turn is aligned with a passage 112 in the base 92 so that operating fluid under pressure can be conducted to the pressure chamber 13 of the pilot valve P' from the supply tube 109.

The base 102 has two arcuate grooves 113 and 114 rabbeted in its inner face with the grooves 113 and 114 interconnected at a point coinciding with a port 115, and with the opposite ends 116 and 117 of the grooves spaced 120° from the port 115 and from each other. The port 115 and the groove terminals 116 and 117 are arranged so that they register with the passages 97$^c$ and 95$^c$ and 99$^c$, respectively, formed in the gasket 101 so that the ports 95$^a$, 97$^a$, and 99$^a$ in the base 92 are adapted to be in constant communication with the grooves 113 and 114. The port 115 communicates with the inner end of an opening 118 through a passage 119. The outer end of the opening 118 is threaded and has a conventional fitting 120 mounted therein. A tube 121 has one end thereof connected to the fitting 120 and the opposite end 122 (Fig. 11) of said tube is connected with the valve V so as to communicate with the diaphragm chamber therein.

The operation of the pilot valve P' is the same as that of the pilot valve P, except that the rotation of the pilot element R is effected by actuation of a brass spur gear 125 secured to the shaft 21 by a screw 125$^a$ and a stainless steel rod 126 adapted to serve as a rack, instead of through the arm 33, the rack 126 being in the form of a rod associated with the pressure-responsive device X, as will be described more fully hereinafter.

As illustrated in Fig. 11, the pressure-responsive device X includes housing sections 131 and 132, which preferably are cast of brass or other corrosion-resisting material. A flexible diaphragm 133 is interposed between the housing sections 131 and 132 and these parts are held in assembled relation by six bolts 134. The housing section 131 is provided with a chamber 135 adapted to receive the housing 5 of the pilot valve P'. The wall of the housing section 131 defining the chamber 135 has an end surface 136 (Fig. 13) which engages one side of a gasket 137, and the opposite side of said gasket is engaged with the outer surface of the flange 6 of the housing 5. Six bolts 138 project through aligned openings in the sub-base 102, the gasket 101, the base 92, the gasket 4, the flange 6, the gasket 137 and into threaded openings 139 in the housing section 131 to secure the pilot valve P' to said housing section.

The rod 126 (Fig. 11) is threaded medially of its length, as indicated at 140 and extends through the diaphragm 133, brass nuts 141 and brass plates 142 being arranged upon opposite sides of the diaphragm to securely clamp said diaphragm to said rod. The left end of the rod 126 is provided with a series of ridges 143, which mesh with the teeth of the pinion 125 for effecting rotation of the pilot drive shaft 21. The housing section 131 is provided with a chamber 144 on the pilot valve side of the diaphragm 133 and a passage 145 communicates with said chamber. The outer end of the passage 145 is threaded and a conventional fitting 146 is mounted therein. One end of a conduit 147 is connected to the fitting 146 and the opposite end 148 of said conduit is connected with the inlet chamber of the valve P.

The housing section 132 is provided with an internally threaded boss 149 into which one end of a brass pipe nipple 150 is threaded and a brass cap 151 is threaded onto the opposite end of said pipe nipple. The rod 126 includes a reduced end portion 152 which projects through an opening 153 in the housing section 132 and into the pipe nipple 150. A washer 154 is carried on the rod end 152 and forms a seat for one end of a compression spring 155. The opposite end of the compression spring 155 seats upon a washer 156 carried on the inner end of an adjusting screw 157 which projects through a threaded opening 158 in the cap 151. A jamb nut 159 locks the bolt 157 in the desired position of adjustment.

It will be apparent from Fig. 11 that, as pressure increases in the pipe line L on the inlet side of the valve V, it will be communicated through the tube 147 to the chamber 145 of the pressure-responsive device X and act against the diaphragm 133, tending to flex the same toward the right against the resistance offered by the spring 155. When the pressure in the chamber 145 becomes greater than that for which the spring 155 has been set, the diaphragm 133 will be flexed toward the right and rod 126 will be shifted bodily relative to the pilot valve P' to cause clockwise rotation of the pinion 125 and shaft 21 (as viewed in Fig. 12) to position the rotatable pilot element R to effect opening of the valve V by exhausting operating fluid from the diaphragm chamber thereof through the tube 121 and the drain conduit 105. The relation of the rotatable element R with respect to the base plate 92 and the fluid distribution base 102 under such condition is diagrammatically illustrated in Fig. 18. Thus, the exhaust grooves 50, 51 and 52 now register with the ports 95$^a$, 97$^a$ and 99$^a$ of the base 92 so that operating fluid under pressure is exhausted from the diaphragm chamber of the main valve V through the conduit 121 and fitting 120, through the passage 119, port 115, and grooves 113 and 114, in the sub-base 102, through the ports 95$^a$, 97$^a$ and 99$^a$ in the base 92 and the holes 95, 97 and 99 in the seat 93, through the holes 67, 69 and 71 in the disc 55, thence into the exhaust grooves 50, 51 and 52 in the rotatable element R, then out through the central exhaust port 66 in the disc 55, through the exhaust port 94 in the seat 93, the port 94$^a$ in the base 92, the passages 94$^d$ and 94$^e$ in the base 102, thence through the fitting 104 to be finally discharged through the drain tube 105, whereby to permit opening of the valve V to relieve the pressure in the line L.

Figure 19:
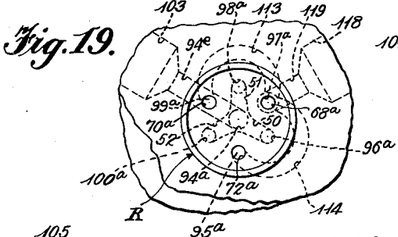
Fig. 19 is a similar view but showing the rotatable pilot element in a position to effect closing of the relief valve.

As the pressure in the pipe line L is reduced to that for which the spring 155 of the pressure-responsive device X has been set, said spring will flex the diaphragm 133 toward the left to the position shown in Fig. 11, carrying with it the rod 126 so that the pinion 125 is now rotated counterclockwise to restore the shaft 21 and the rotatable element R to their initial position in which operating fluid under pressure is admitted to the diaphragm chamber of the main valve V through the tube 121 from the pressure chamber 13 of the pilot valve P'. The relation of the ports of the rotatable element R with respect to the ports and passages of the base 92 and sub-base 102 is diagrammatically shown in Fig. 19. It will be noted that the pressure ports 68$^a$, 70$^a$ and 72$^a$ are now aligned with the ports 97$^a$, 99$^a$ and 95$^a$, respectively, of the base 92. Operating fluid, of course, will be supplied to the pressure chamber 13 through the tube 109. The flow of operating fluid from the ports 95$^a$, 97$^a$ and 99$^a$ to the diaphragm chamber of the main valve V will occur through the base 102 but in the reverse direction from that described above for exhausting spent operating fluid from the diaphragm chamber of said main valve.

It will be noted that the ports 96$^a$, 98$^a$, and 100$^a$ of the base 92 perform no function when used with a sub-base such as the member 102, but it will be understood that these ports may be active with other forms of sub-bases (not shown).

Fig. 20 illustrates a modified form of base member 160 which may be employed in the pilot valve P' shown in Fig. 13 in lieu of the base member 92. The base 160, instead of having a disc sweated to one face thereof, has a seat 161 consisting of a circular stainless steel disc member 162 pressed into an opening 163 in the base 160. The disc 162 is provided with a central exhaust port 164 and six other ports similar to the ports 95$^a$ to 100$^a$ of the disc 92, but only two of these, to wit, ports 165 and 166 being shown. In constructing the base disclosed in Fig. 20, the ports 164, etc., thereof are drilled and the seat 161 is ground, if necessary, and lapped to provide a smooth surface to be engaged by the disc 55 of the rotatable member R.

The rotatable disc 55 and the seat discs 83, 93 and 162 are made as small as ½ inch in diameter in actual practice and the six equally spaced holes are made as small as $\frac{1}{16}$ inch in diameter and the central exhaust port as small as $^3/_{32}$ inch in diameter. The capacity of the pilot valve can, of course, be increased by increasing the size of the parts and ports, but this cannot be done without a resulting increase in the total fluid pressure forcing the disc 55 against its seat. Such increase in pressure will make it necessary to apply a greater operating force to turn the disc, so that increasing the size of the parts cannot be done without sacrificing sensitive operation of the pilot valve by a very light operating force. The present pilot valve with its small disc 55 is very sensitive and can be rotated by a force as low as two ounces. Hence, the importance of the multiple port arrangement to increase the volume of flow of operating fluid and thereby assure more rapid operation of the devices controlled by the pilot valves P and P' without using large parts with their accompanying high operating force, becomes manifest.

Thus, it will be understood that the exhaust port 66, for example, of the disc 55 (Fig. 5) is of such size that it has a flow capacity about equal to that of the three ports 67, 69 and 71 which communicate therewith through the exhaust grooves 50, 51 and 52. The exhaust port 66$^c$ in the base 1 has a similar large flow capacity. It will also be noted that the exhaust port 94$^a$ in the base 92 and the exhaust port 94$^d$ in the sub-base 102 are of the larger size. Also, the port 115 in the base member 92 is of the same diameter as the exhaust port 94$^d$. Hence, by providing the arcuate grooves 113 and 114, in association with the large port 115 and the large exhaust port 94$^d$, the capacity of the pilot valve P' is greatly increased above what it would be, for example, if only a single exhaust groove 50 and a single pressure port 70ª were provided.

It will be understood that the details of construction and porting arrangements of the pilot valve units P and P', and the details of construction and arrangement of the pressure-responsive device X disclosed herein may be modified in various respects without departing from the spirit of the invention or the scope of the annexed claims.

I claim:

1. A composite member for use in a pilot valve and the like, comprising: a sheet metal cup having a bottom wall provided with at least one inwardly pressed elongated radial depression; a body of metal in said cup; and a metal disc overlying said depression and bonded to the unpressed portions of the outer surface of said bottom wall, said body of metal, bottom wall and disc having aligned ports providing at least one through-passage through said rotatable member, said disc also having port means communicating with said depression.

2. A pilot valve, comprising: housing means providing a chamber for operating fluid under pressure; means for conducting operating fluid under pressure to said pressure chamber; a shaft extending into said pressure chamber; a drive member secured to the inner end of said shaft; a rotatable element in said pressure chamber, said rotatable element including a sheet metal cup and a disc, said cup having a side wall and a bottom wall, said bottom wall having a plurality of inwardly pressed elongated depressions formed therein, said depressions merging at a point axially of said bottom wall, said disc overlying said depressions and being secured to said cup; interengaging means on said drive member and cup establishing a driving connection between said drive shaft and said rotatable member, said cup being partially filled with a lead body to weight the same, said disc, bottom wall and lead body having a plurality of ports extending therethrough, said last-mentioned ports being disposed intermediate said depressions, and said disc having an axial port communicating with said depressions and a plurality of exhaust ports spaced radially from said axial port and disposed intermediate said through ports each communicating with the outer end portion of one of said depressions; and a seat for said disc in said housing means provided with passages cooperable with the ports of said disc.

3. A pilot valve, comprising: a housing having a chamber adapted to receive operating fluid under pressure; a ported plate member secured to said housing and forming a closure for one end of said pressure chamber; a rotatable pilot member in said pressure chamber including a sheet metal cup and a disc, said cup having a side wall and a bottom wall, said side wall having a number of notches formed in the upper edge thereof, and said bottom wall having at least one inwardly extending radial depression formed therein, said disc being secured to the outer undepressed surface of said bottom wall and overlying said radial depression, said bottom wall of said cup and said disc having permanently aligned holes forming a pressure port, said disc also having an axial port and an exhaust port spaced radially therefrom so that both ports communicate with said depression, said ported plate member having a drain passage communicating with said axial port of said disc and having at least one other passageway adapted to be selectively placed in communication with either said pressure port or said exhaust port of said disc; and means for effecting rotation of said cup including a drive member in said pressure chamber having projections received in the notches formed in the side wall of said cup.

4. A pilot valve, comprising: a housing having an end wall at one end thereof and providing a chamber for operating fluid under pressure; a base member secured to the opposite end of said housing and forming a closure for said pressure chamber; means for conducting operating fluid under pressure to said pressure chamber; a shaft extending through said end wall into said pressure chamber; a drive member secured to the inner end of said shaft, said drive member having a number of projections formed on its periphery; a rotatable element in said pressure chamber, said rotatable element including a sheet metal cup and a disc, said cup having a side wall and a bottom wall, said bottom wall having three inwardly pressed elongated depressions formed therein, said depressions being substantially equally angularly spaced and all merging at a point axially of said bottom wall, said disc overlying said depressions and being secured to said cup member, said side wall of said cup having a number of notches formed therein and receiving the projections of said drive member to establish a driving connection between said drive shaft and said rotatable member, said cup member being partially filled with a lead body, said disc, bottom wall and lead body having three pressure ports extending therethrough, said pressure ports being disposed intermediate said depressions, and said disc having an axial port communicating with said depressions and three exhaust ports spaced radially from said axial port and disposed intermediate said pressure ports each communicating with the outer end portion of one of said depressions, said base member being provided with passages cooperable with the ports of said disc.

5. A pilot valve, comprising: a generally cylindrical sheet metal housing having a side wall with an end wall at one end thereof and an outwardly extending flange at the opposite end thereof, the portion of said housing intermediate said end wall and flange providing a pressure chamber for operating fluid under pressure and being formed with an outwardly extending shoulder; a sheet metal cap member enclosing said end wall and engaging said shoulder, said end wall and said cap member having aligned passageways; a shaft extending through said passageways and into said pressure chamber, said side wall of said housing also having an inwardly extending shoulder; a guide member for said shaft seated against said last-mentioned shoulder; a drive member secured to the inner end of said shaft; a rotatable member in said pressure chamber arranged to be rotated by said drive member, said rotatable member comprising a sheet metal cup having a bottom wall provided with at least one inwardly pressed elongated depression extending radially outwardly from the center thereof and a disc overlying said depression and secured to said cup, said bottom wall and disc having aligned ports circumferentially spaced from said depression providing a through-passage through said rotatable member, said disc also having port means communicating with said depression including a central port communicating with the inner end of said depression; and a base member secured to the flange of said housing and provided with passageways cooperable with the ports of said disc.

6. A pilot valve, comprising: a generally cylindrical sheet metal housing having a side wall with an end wall at one end thereof and an outwardly extending flange at the opposite end thereof, the portion of said housing intermediate said end wall and flange providing a pressure chamber for operating fluid under pressure and being formed with an outwardly extending shoulder; a sheet metal cap member enclosing said end wall and engaging said shoulder, said end wall and said cap member having aligned passageways; a shaft extending through said passageways and into said pressure chamber, said side wall of said housing also having an inwardly extending shoulder; a guide member for said shaft seated against said last-mentioned shoulder; a drive member secured to the inner end of said shaft; a rotatable member in said pressure chamber arranged to be rotated by said drive member, said rotatable member comprising a sheet metal cup having a bottom wall provided with at least one inwardly pressed elongated depression extending radially outwardly from the center thereof and a disc overlying said depression and secured to said cup, said bottom wall and disc having aligned ports circumferentially spaced from said depression providing a through-passage through said rotatable member, said disc also having port means communicating with said depression including a central port communicating with the inner end of the depression; means connected with said shaft for turning said shaft; and base means secured to said housing and provided with passageways cooperable with the ports of said disc.

DONALD G. GRISWOLD.

REFERENCES CITED

The following references are of record in the file of this patent:

UNITED STATES PATENTS

| Number | Name | Date |
|---|---|---|
| 1,121,140 | Schoonmaker | Dec. 15, 1914 |
| 1,829,022 | Stevenson | Oct. 27, 1931 |
| 1,841,453 | Rigby | Jan. 19, 1932 |
| 1,976,417 | Steinberg | Oct. 9, 1934 |
| 2,031,309 | Hahn | Feb. 18, 1936 |
| 2,042,186 | Peterson | May 26, 1936 |
| 2,193,720 | Griswold | Mar. 12, 1940 |
| 2,233,192 | Armington | Feb. 25, 1941 |
| 2,251,481 | Corbin | Aug. 5, 1941 |
| 2,344,714 | Martin | Mar. 21, 1944 |
| 2,344,913 | Ager | Mar. 21, 1944 |
| 2,361,655 | Robinson | Oct. 31, 1944 |
| 2,399,301 | Spence | Apr. 30, 1946 |